United States Patent

Copeland, III

[15] 3,653,010

[45] Mar. 28, 1972

[54] MAGNETIC DOMAIN LOGIC ARRANGEMENT

[72] Inventor: John Alexander Copeland, III, Gillette, N.J.

[73] Assignee: Bell Telephone Laboratories, Incorporated, Murray Hill, Berkeley Heights, N.J.

[22] Filed: Nov. 12, 1970

[21] Appl. No.: 88,691

[52] U.S. Cl..............340/174 TF, 340/174 SR, 340/174 CR, 307/88 LC

[51] Int. Cl..........................................................G11c 21/00

[58] Field of Search..........................340/174 TF; 307/88 LC

[56] References Cited

UNITED STATES PATENTS 3,553,661 1/1971 Hadden, Jr.......................340/174 TF

*Primary Examiner*—James W. Moffitt

*Attorney*—R. J. Guenther and Kenneth B. Hamlin

[57] ABSTRACT

A strip of magnetically soft material of proper geometry defines stable positions to either side thereof for single wall domains moving therealong in a sheet of magnetic material. An opening in the strip has been found to produce an inversion function and an opening in two strips where they intersect similarly provides a crossover for information moving along the rails.

10 Claims, 13 Drawing Figures

INVENTOR
J. A. COPELAND III
BY Herbert M. Shapiro
ATTORNEY

MAGNETIC DOMAIN LOGIC ARRANGEMENT

FIELD OF THE INVENTION

This invention relates to data processing arrangements, particularly arrangements which employ single wall domain propagation devices.

BACKGROUND OF THE INVENTION

A single wall domain is a magnetic domain encompassed by a single domain wall which closes on itself in the plane of the medium in which it moves. Such a domain is a stable, self-contained entity free to move anywhere in the plane of the medium in response to offset attracting magnetic fields.

Magnetic fields for moving domains are often provided by an array of conductors pulsed individually by external drivers. The shape of the conductors is dictated by the shape of the domain and by the material parameters. Most materials suitable for the movement of single wall domains exhibit a preferred direction of magnetization normal to the plane of movement and are magnetically isotropic in the plane. Conductors suitable for domain movement in such materials are shaped as conductor loops providing magnetic fields in first and second directions along an axis also normal to the plane. By pulsing a succession of conductors of the array consecutively offset from the position of a domain, domain movement is realized. In practice, the conductors are interconnected serially in three sets to provide a familiar three-phase shift register operation. The use of single wall domains in such a manner is disclosed in U.S. Pat. No. 3,460,116 of A. H. Bobeck, U. F. Gianola, R. C. Sherwood and W. Shockley, issued Aug. 5, 1969.

My copending application Ser. No. 49,273, filed June 24, 1970 describes an alternative domain propagation arrangement in which domains move along a magnetically soft rail on (or along a groove in the surface of) a suitable magnetic material from input to output positions. The rail has a geometry to define a stable position for a domain to either side thereof permitting a domain to one side of the rail to represent a binary zero and a domain to the other side to represent a binary one.

It is advantageous in such a rail arrangement to employ a rail which closes on itself in a loop geometry and is operated in a mode in which information recirculates about a closed channel defined by the loop. The closed loop configuration is operated with a domain in each stage, normally in a reference position to one side of the rail for selective movement across the rail at an input position. Domains are conserved in this system, accordingly, and it is required neither to generate nor annihilate domains. Moreover, the presence of a domain in each stage capitalizes on interaction forces between domains to provide a relatively rigid propagation system which permits relatively close domain spacing and thus high packing density.

My copending application Ser. No. 76,883, filed Sept. 30, 1970, describes a logic AND circuit which uses a two-rail system where the distance between the rails is reduced at a position to permit interaction between domains simultaneously on both rails at that position to cause one of the domains to cross its rail. In order to realize a complete set of logic functions with such a rail system, it is important to be able to perform inversion and crossover functions.

BRIEF DESCRIPTION OF THE INVENTION

This invention is based on the realization that an opening in the rail of a domain rail propagation arrangement causes an inversion operation to be performed on that domain, of a sequence of domains, which is at the opening and that such an opening at the intersection of two orthogonal rails operates as a crossover. An exclusive OR circuit is realized in an illustrative embodiment of this invention by providing apertures in rail channels otherwise designed to perform AND functions in accordance with my aforementioned application. The apertures define both inversion and crossover functions.

In an illustrative embodiment, four magnetically soft rails define propagation channels in a sheet of material in which single wall domains can be moved. In five positions, the rails approach one another in pairs to permit domain interactions to cause ones of the domains to cross rails. The five positions are separated by lengths of rails which include openings for effecting inversion operations and an opening in two intersecting rails for defining a crossover. An exclusive OR function results.

DETAILED DESCRIPTION

Figure 1:
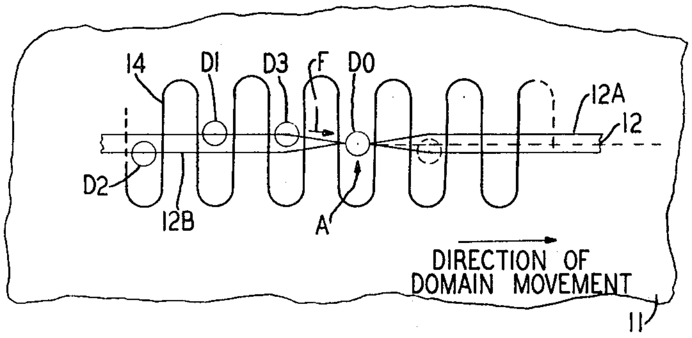
FIGS. 1, 2, 3, and 4A and 4B are schematic illustrations of domain rail logic arrangements in accordance with this invention.

FIG. 1 shows a portion 11 of a slice of material in which single wall domains can be moved. A magnetically soft strip 12 typically of permalloy is juxtaposed with portion 11. Strip 12 is of a geometry to define a stable location for a domain to the top or bottom thereof as represented by domains D1 and D2 in the FIG. The strip serves as a rail along which domains so disposed are moved as disclosed in my copending application Ser. No. 49,273 filed June 24, 1970.

The rail is shown crossed by a serpentine line 14 in FIG. 1. Line 14 represents a pair of offset electrical conductors which are pulsed in the alternative (each positive, then each negative) to generate consecutive field patterns to advance domains along the rail from stage to stage. For simplicity, only a single serpentine line is shown in FIG. 1, the period of the line defining the stages along the rail. A domain to one side of rail 12 is moved from stage to stage along the rail by pulses on the conductors represented by line 14 without crossing the rail.

In accordance with this invention, rail 12 includes an aperture A which divides rail 12 into two parts 12A and 12B. Each domain being advanced along a first side of rail 12 may cross the rail at aperture A and advance thereafter along the opposite side of the rail as will become clear hereinafter. It may be noted in FIG. 1 that domains D1 and D2 protrude beyond opposite sides of rail 12 and are tangent to the edge of the rail opposite to that beyond which the domain protrudes in each instance. It will also be noted that portions 12A and 12B of rail 12 illustratively come to points at the aperture thus causing each domain to protrude further near the aperture. The domains, moving from left to right as viewed, are displaced along the edge of the rail to which they are tangent and move consecutively into a neutral position at the aperture. The term neutral designates a position which is symmetrically disposed with respect to the axis of the rail rather than offset laterally with respect to that axis (protruding) as is the case with a domain moving tangent to an edge of the rail.

Figure 2:
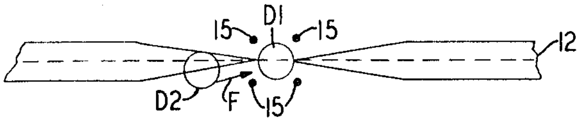

A domain moving tangent to the edge of a rail as shown in FIG. 1 moves into a neutral position primarily because a least energy condition for the domain at the end of a magnetically soft strip is achieved when as much of the domain wall couples the strip as is possible. This condition is achieved when the domain moves into a symmetrical position described at the aperture. Relatively small permalloy dots 15 may be employed in an array as shown in FIG. 2 to define a symmetrical position for a domain at an aperture in a rail to ensure proper positioning of the domain.

A domain in a neutral position experiences an interaction force with a next subsequent domain. In FIG. 1, this interaction force is directed along arrow F between domain D3 and domain DO. The arrow can be seen to be at an angle with respect to the axis of rail 12 and operates to move domain D0 downward for subsequent movement to the right along the bottom of the rail in response to further pulses on the conductors represented by line 14.

If we adapt the convention that domains moving along the top of rail 12 represent binary ones and domains moving along the bottom represent binary zeros, the binary one represented by domain D3 can be understood to cause domain D0 to represent a binary zero by causing the latter to move from a neutral position to the bottom of the rail. In effect, any domain approaching an aperture A of FIG. 1 causes the next preceding domain to move from a neutral position in the aperture to the side (bottom) of the rail opposite to that of the approaching domain. The operation is useful as an inversion function as long as care is taken to adjust for the one stage advance of the significant information at the aperture. Such care is taken merely by a proper placement of a detector or by the proper adjustment of rail lengths particularly when a multirail logic system is employed. A properly adjusted multirail system is described hereinafter.

Of course, the opposite inversion function is achieved if domain D3 were moving along the bottom of rail 12 as is D2 in FIG. 1. In this case, domain D1 may be envisioned in the neutral position as shown in FIG. 2 and domain D2 exerts a force upward and to the right as indicated by the arrow F in the FIG. Domain D1 in this instance moves thereafter to the right along the top of rail 12 from its position in FIG. 2.

The inversion operation, in accordance with this invention can be seen to require a domain in a neutral position at an aperture in a rail followed by a domain to one side of the rail or the other for determining the future position of the domain in the neutral position. Typically, a rail propagation arrangement of the type employed herein is of a closed loop configuration. The closed loop configuration operates to recirculate information continuously between input and output positions not shown. Domains representative of information are normally in reference positions (zeros) below a rail for selective movement to the top of the rail at an input position as disclosed in my aforementioned copending application. Domains at the top of the rail are returned to the reference positions conveniently at the output position as is discussed below. Accordingly, each stage of such a register is occupied by a domain in one of the two possible locations there thus ensuring the succession of domains required for inversion in each instance.

The orientation of rail 12 in the plane of slice 11 of FIG. 1 is of no importance as far as domain propagation or inversion is concerned because these functions are determined by the conductors represented by line 14 of FIG. 1 and the conductors are disposed along the rail regardless of rail orientation. Accordingly, the rail can be at any orientation in FIG. 1 and, in fact, two rails can intersect at an aperture.

Figure 3:
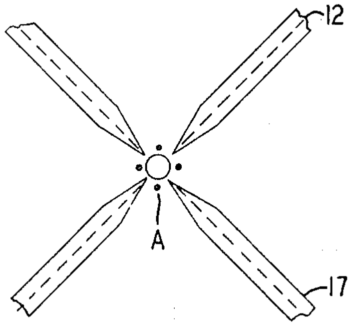

FIG. 3 shows two rails 12 and 17 oriented perpendicular to one another and intersecting at aperture A of FIG. 1. Each of these rails functions as described for rail 12 in FIG. 1 independently of the operation of the other rail so long as care is taken to ensure that domains move alternately from one rail then the other into the neutral position at A.

One simple method for achieving the entrance of domains from alternative ones of intersecting rails into the neutral position at the intersection therebetween is to apply a four-phase cycle to conductors along a first of the rails and then to the conductors along the second. Operation is entirely analogous to the inverter operation as described above in each instance.

Figure 4A:
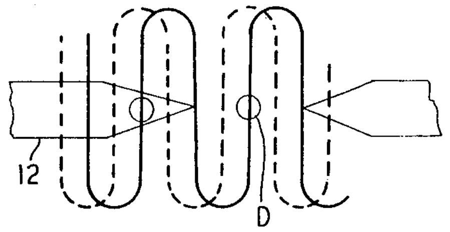
Figure 4B:
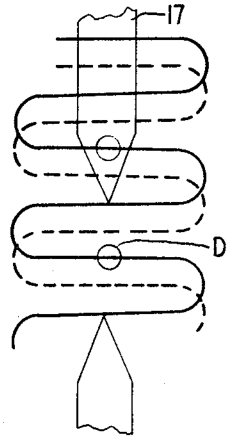

FIGS. 4A and 4B show the conductor pairs for each of rails 12 and 17 at the crossover of FIG. 3. Each FIG. may be recognized to show an inverter as appears in FIG. 1. The position of domain D as shown in each FIG. is consistent with domain movement for each inverter. The domain is supplied in the position shown first by, say, rail 12 then by rail 17. Since domain D occupies a position common to the two rails, two $n$-stage rails have $2n - 1$ domains circulating thereabout if they include a crossover.

The alternative movement of domains into aperture A may also be controlled by a proper selection of a common opening between two rails with respect to the propagation conductors so that the opening coincides with different phases for the two rails.

Either arrangement permits domains from the two rails to be interleaved at the intersection, domains approaching the intersection from one rail leaving the intersection along the other. The information represented by the domains, on the other hand, is inverted and moved along the continuation of the rail along which it approaches such an intersection as if the cross rail were absent.

The rail in FIG. 1 is shown coming to a point at the aperture. Since a domain rides along the edge of the rail opposite to the side of the rail beyond which it protrudes, the diminished width of the rail as it comes to a point forces a domain to protrude further as can be seen in FIG. 1. In this manner, the direction of the interaction force (arrow F in FIG. 1) is determined. In terms of domain diameter D, the rail typically decreases in width from 0.50 to 0 over a distance of 4 diameters. The angle which arrow F makes with the axis of the rail is about 10°.

In order to achieve a complete set of logic functions with rail propagation arrangements, it is necessary to perform inversion and crossover operations of the type described. Consider, for example, a multirail arrangement where domain streams on first and second rails are moved through interaction points where AND operations are carried out by interaction with domains moving synchronously along first and second control rails respectively. The use of both inversions and crossovers in accordance with this invention permits the realization of an illustrative exclusive OR circuit.

Figure 5:
FIGS. 5 and 6 are functional symbols of the arrangements of FIGS. 1, 2, and 3.
Figure 6:

The exclusive OR circuit will be explained in terms of symbols which represent the inversion and crossover functions. These symbols are shown in FIGS. 5 and 6. FIG. 5 is the symbol for the inversion function. The symbol comprises an arrow representing the rail, directed to the right to indicate the direction of flow of information. The arrow is intersected by two crossed arrows aligned along diagonals and indicating that a binary one to the left above the rail moves to the bottom of the rail at the right. Similarly, a binary zero to the left below the rail moves to the top of the rail at the right. FIG. 6 shows the crossed arrows of FIG. 5 with a C superimposed on them representing the crossover.

Figure 7:
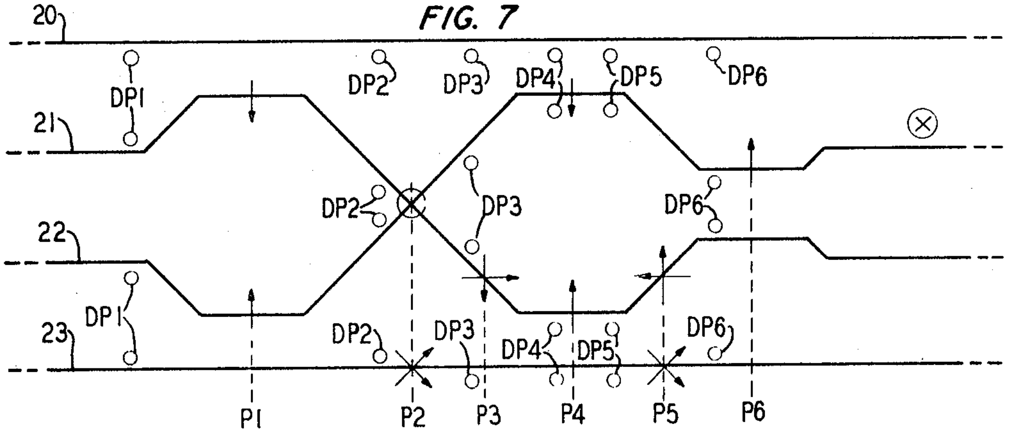

FIG. 7 is a line diagram of the rail arrangement defining an exclusive OR circuit in accordance with this invention. The circuit comprises four rails 20, 21, 22, and 23 along which domains move in a closed loop fashion, via continuations of the rails (not shown) in a juxtaposed slice of magnetic material as shown at 11 in FIG. 1. There are six positions of interest, designated P1–P6 in FIG. 7, in the flow of information from left to right in the FIG. We will consider the consecutive operations performed on information as it passes through these six positions and observes the output at a detection point indicated by the encircled X sign to the right in FIG. 7 at the top of rail 22.

The circuit operates by moving domain streams from left to right in FIG. 7 through the six positions. Only binary ones are moved along rail 21 into position P1. Similarly, only binary zeros are moved along rail 22 into position P1. In order to provide an output at the encircled X sign, it should be understood that a zero moving along rail 22 has to become a one.

The rails can be seen to be spaced relatively closely in FIG. 7 at various ones of the positions of interest. For example, at position P1, rails 20 and 21 and rails 22 and 23 are spaced relatively closely together. This is true also for the rail pairs 20 and 22 and 21 and 23 at position P4 and for rails 21 and 22 at position P6. At each position where rails are relatively closely spaced, an AND operation occurs between the information representations in the two rails. The AND operation results, for example, in domains crossing rails 21 and 22 from top to bottom and from bottom to top respectively at position P1 when a domain occurs simultaneously in a zero position with respect to (below) rail 20 and in a one position with respect to (above) rail 23. The direction of crossing is indicated by the neutral arrows at the several positions. The rails actually crossed by a domain are of a geometry (weakened) to permit such crossing as disclosed in my copending application, Ser. No. 76,883 filed Sept. 30, 1970 mentioned above. Similar operations effect the downward and upward movement of a domain across rails 22 and 21 respectively in position P4 and the upward movement of a domain across rail 22 at position P6.

An exclusive OR circuit functions to produce an output when a binary one occurs on only one of rails 20 or 23 and produces no output when a binary one or zero occurs on both. We will consider the first three cases in detail remembering that a binary one is represented by a domain to the top of a rail and a binary zero is represented by a domain to the bottom of the rail.

The case where a binary zero occurs on rail 20 and a binary one occurs on rail 23 is illustrated in FIG. 7 by the domains DP1 to the left in the FIG. moving into position P1. A domain crossing occurs at position P1 only when two domains are moving between two rails at the position where the rails are closely spaced. This is the case for both rail pairs 20-21 and 22-23 in FIG. 7. The resulting domain disposition is represented by domains DP2 in FIG. 7. It is to be noted that the domains moving along rails 21 and 22 are shown to have crossed these rails.

At position P2, a crossover occurs between rails 21 and 22 and an inverter occurs in rail 23. The domains moving along rails 21, 22, and 23 invert and the domain moving along rail 20 remains unchanged. The resulting domain configuration is represented by domains DP3 in FIG. 7.

At position P3, an inverter occurs in rail 21, consequently the domain there moves to the bottom of the rail. The domains synchronously moving along the other channels remain unchanged. Domains DP4 in FIG. 7 represent the results.

At position P4, two domains are not moving between the rails at either AND circuit. Thus, no rail crossings occur. The result is indicated by domains DP5 in FIG. 7.

An inverter occurs in each of rails 21 and 23 at position P5 thus inverting the information there. The remainder of the information remains unchanged. The result is indicated by domains DP6.

It is important to note that two domains are now moving between rails 21 and 22 at position P6 where those rails are closely spaced. The AND circuit requires the domain below rail 22 to cross that rail to a position for detection at the encircled X sign. It is clear at this juncture in the operation that a binary one and binary zero on rails 23 and 20 respectively produce an output.

The opposite case where a binary one and a binary zero occur on rails 20 and 23 respectively also produces an output as now described in connection with FIG. 8. Once again domains are moved along the four rails 20, 21, 22, and 23 from left to right through six positions and once again we will demonstrate an output at the encircled X sign to the right in the FIG. In this case, however, a domain occurs at the input above rail 20 and below rail 23 as indicated by the domains DP1 in FIG. 8.

Figure 8:
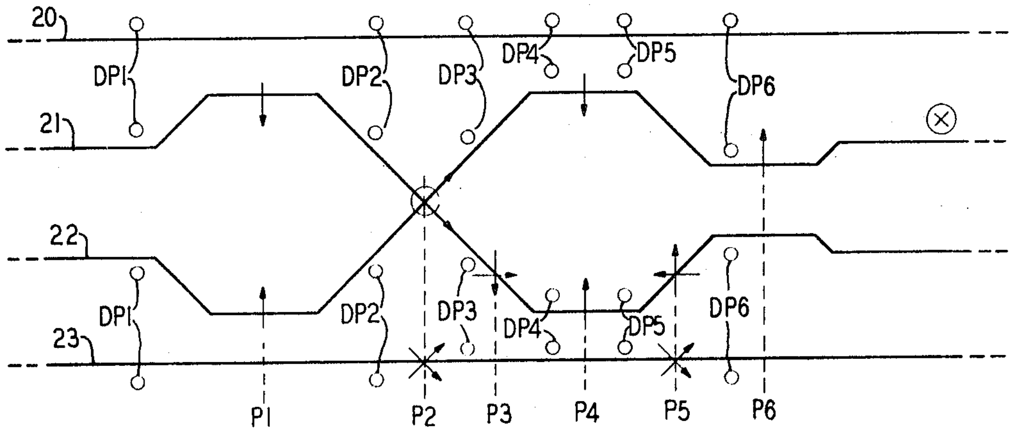

No rail crossings occur at position P1 in this instance as is apparent from the FIG. The result is represented by domains DP2 in FIG. 8. At position P2, on the other hand, rail crossings occur on rails 21, 22, and 23 as in the previous case. The result is indicated by the domains DP3 in FIG. 8.

Once again, a rail crossing occurs at position P3 in rail 21, the results being indicated by domains DP4 in FIG. 8.

It is clear from the FIG. that no rail crossings occur at position P4 and the unchanged domains, now DP5, approach position P5 where a rail crossing occurs in each of rails 21 and 23. The result is represented by domains DP6 in FIG. 8.

At position P6, no rail crossings occur but a domain is already in the binary one position to the top of rail 22 for detection at the encircled X sign.

Figure 9:
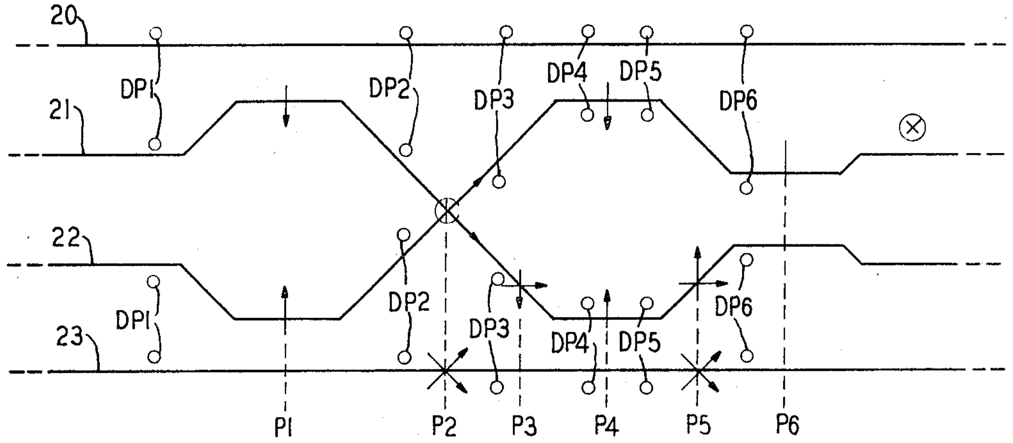
FIGS. 7, 8, 9, and 10 are line diagrams of an exclusive OR circuit employing the arrangements of FIGS. 1, 2, and 3, and showing the magnetic configurations therein during operation.

The case where a binary one occurs in both rails 20 and 23 will now be shown to produce no output in connection with FIG. 9. The initial domain disposition is shown by domains DP1 in FIG. 9. At position P1, a domain crosses rail 22 yielding the domain disposition represented by domain DP2 in the FIG.

At position P2 domains cross rails 21, 22, and 23 as before. The resulting domain disposition is represented by domain DP3.

At position P3 a domain crosses only rail 21 yielding the domains DP4 in FIG. 9.

As is clear from the FIG., no domain crossings occur at position P4 resulting in the domain configuration DP5.

At position P5, a domain crosses each of rails 21 and 23 yielding the domain disposition represented by domains DP6.

No domain crossings occur at position P6 and thus, no domain is moving along the top of rail 22 for detection at the encircled X sign.

Figure 10:
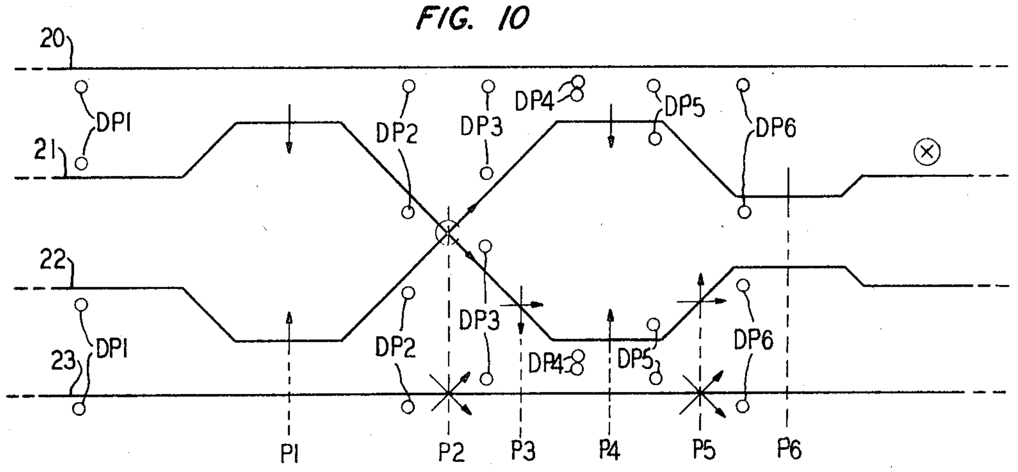

A consideration of the domain configurations along rails 20 and 21 and along rails 22 and 23 of FIG. 10 provide an understanding of the case where a zero occurs on rails 20 and 23. In this case, the domain associated with rail 21 is in a zero position at position P6 as is the domain associated with rail 22 at position P6. No interaction occurs there accordingly and no output results.

Therefore, the operation of an exclusive OR circuit in accordance with this invention has been demonstrated.

In the description of the operation of the multi-rail exclusive OR circuit in connection with FIGS. 7, 8, 9 and 10, little attention was given to the fact that an inverter or crossover in accordance with this invention operates in a manner which advances information one position on each occurrence. For a single rail system, adjustment can be made for such an advancement by synchronization of inputs and outputs or by the placement of a detector. For multirail arrangements, interactions between information in the several rails has to occur synchronously and the rails have to be adjusted in length to compensate for unequal advancement of information along the rails.

The necessity for the rail length adjustment can be understood with reference to FIG. 7. Consider rail 21. A domain moving along the rail encounters an inversion at each of positions P2, P3, and P5. A domain moving along rail 22, on the other hand, encounters an inversion only at P2. In the first instance, the significant information is advanced three positions; in the latter only one. Yet the significant information must arrive synchronously at, for example, position P6 for selective interaction. Obviously, rail 22 must be two stages shorter than rail 21 to ensure such operation.

The same sort of situation occurs at position P4. If information moving along rail 20 is considered to be in a reference position, information moving along rail 21 is advanced two positions, information moving along rail 22 is advanced one, and information moving along rail 23 is advanced one position. Yet all the information arrives synchronously at position P4 for selective interaction in the illustrative embodiment. Again the lengths of the rails are adjusted to compensate for the relative displacement of synchronous significant information.

The alternative provision of the drive pulses to conductors associated with two rails which define a crossover as discussed above is consistent with the multirail exclusive OR circuit as shown in FIG. 7. In such a situation, four phase drive pulses are applied to the conductors associated with rails 20 and 22. Thereafter, four phase drive pulses are applied to the conductors associated with rails 21 and 23. Such a pulsing arrangement moves a domain along rail 22 into positions P1 and P6 one cycle prior to the arrival of the possible interaction domains along rails 21 and 23. This drive arrangement causes only negligible delays in interaction, the operations as described occurring on the following cycle of operation when the second of the interaction domains arrives.

The operation of the arrangement of FIGS. 7, 8, 9, and 10 results in selected domains moving along the top or bottom of rails 21 and 22 depending on the position of domains with respect to the control rails 20 and 23. But the requirements of operation are such that domains always start (to the left in FIG. 7) on the top of rail 21 and the bottom of rail 22. A closed loop rail configuration conveniently may include a mechanism whereby domains are automatically returned to such a chosen reference position with respect to a rail regardless of its output position as indicated in FIG. 7 during a preceding cycle.

Figure 11A:
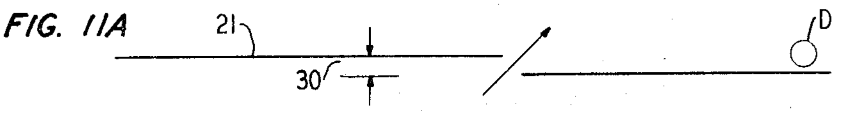
FIGS. 11A and 11B are schematic illustrations of modifications of the arrangement shown in FIGS. 1 and 2.
Figure 11B:
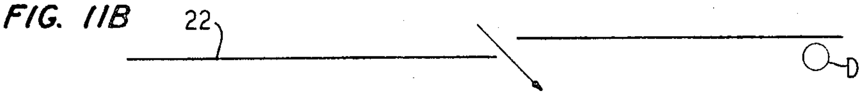

Such a mechanism is achieved also by an aperture in the rail. In this case, however, the rail on the "downstream" side of the aperture is offset laterally in a manner to deny one side of the downstream portion of the rail to advancing domains. This offset is shown in FIGS. 11A and 11B for "generating" a stream of ones and a stream of zeros for rails 21 and 22 respectively as indicated by the domains D in those figures. The horizontal arrow in each of these figures indicates the direction of domain movement. The arrows directed diagonally upward and to the right, and diagonally downward and to the right in FIGS. 11A and 11B, respectively, indicate the only permissible inversion operation in each instance. A domain moving, for example, to the right along rail 21 in FIGS. 11A, whether to the top or bottom of the rail as viewed, is moved to the top of rail 21 at the aperture because of the offset 30 in the rail. Similarly, domains moving along rail 22 in FIG. 11B, on the top or bottom of the rail, ultimately move along the bottom of the rail because of an opposite offset in the rail.

The invention has been described in terms of strips of continuous magnetically soft material. Such continuous strips require certain width-to-thickness ratios in order to define two stable positions for a domain. If the strip is made discontinuous, for example, comprising a series of magnetically soft rectangular dots, relatively thick dots can be used to advantage when minute domains such as occur in garnets are to be moved.

Typically, the dots forming the rail are rectangular in shape with a long axis perpendicular to the axis of the rail so as to minimize the demagnetizing factor when the magnetization of the permalloy is perpendicular to the axis of the rail. Usually there are four of these rectangles to a stage.

Such dots are not to be confused with the dots occurring at apertures in accordance with this invention. The latter dots are symmetrical in disposition about an aperture and do not constitute a linear arrangement as would be the case with the former. Moreover, the symmetrical arrangement of dots is associated with an aperture extending for a stage of the channel. Stages are defined by the period of the drive conductors. In the representation of FIG. 1, line 17 would have 1 period in the aperture of a rail as is shown in FIG. 1. In contradistinction a linear array of dots forming a rail are 0.5 periods or less apart.

What has been described is considered only illustrative of the principles of this invention. Therefore, various modifications can be devised by those skilled in the art in accordance with those principles within the spirit and scope of this invention.

What is claimed is:

1. A magnetic domain logic arrangement comprising a sheet of material in which single wall domains can be moved, a rail defining a propagation channel for domains between input and output stages in said sheet, propagation means for generating repetitive magnetic field patterns for moving domains from stage to stage in said channel, said rail having a geometry to define a stable position for a domain on first and second sides thereof in each of said stages, and said rail also comprising first and second portions separated by a distance of one of said stages along the axis of said channel.

2. An arrangement in accordance with claim 1 wherein said rail comprises first and second magnetically soft film portions separated for defining a one-stage opening therebetween.

3. An arrangement in accordance with claim 1 wherein said rail comprises first and second grooves in the surface of said sheet separated for defining a one-stage opening therebetween.

4. An arrangement in accordance with claim 2 wherein said rail forms a closed loop configuration for recirculating domains thereabout.

5. First and second arrangements in accordance with claim 1 including first and second rails respectively, each of said rails including first and second portions separated by one stage, said rails being arranged at an angle to one another in a manner to define an intersection therebetween at the separations in said rails.

6. An arrangement in accordance with claim 5 wherein said rails are perpendicular to one another.

7. An arrangement in accordance with claim 2 wherein said first and second portions are displaced laterally with respect to one another at said opening.

8. An arrangement in accordance with claim 2 wherein said rail has a geometry at the separation between said first and second portions to move a domain from one stable position to the side thereof to a position symmetrically disposed with respect to the axis of said rail.

9. An arrangement in accordance with claim 5 including magnetically soft dots symmetrically disposed about said axis at said intersection for defining said symmetrically disposed position.

10. An arrangement in accordance with claim 8 including magnetically soft dots symmetrically disposed at said separation for defining said symmetrically disposed position.

* * * * *